United States Patent [19]

Yamabe

[11] 4,108,570

[45] Aug. 22, 1978

[54] FRANCIS-TYPE RUNNER FOR PUMP-TURBINE

[75] Inventor: Masahiro Yamabe, Mito, Japan

[73] Assignee: Hitachi, Ltd., Japan

[21] Appl. No.: 744,452

[22] Filed: Nov. 23, 1976

[30] Foreign Application Priority Data

Feb. 4, 1976 [JP] Japan .................................. 51-10383

[51] Int. Cl.² ................................................. F01D 5/04
[52] U.S. Cl. ............................ 416/186 R; 416/DIG. 2
[58] Field of Search ............. 416/186, 186 A, DIG. 2

[56] References Cited

U.S. PATENT DOCUMENTS

| 3,628,881 | 12/1971 | Hermann | 416/186 X |
| 3,639,080 | 2/1972 | Yamabe | 416/186 |
| 3,874,819 | 4/1975 | Tamura et al. | 416/186 |

FOREIGN PATENT DOCUMENTS

| 691,676 | 10/1930 | France | 416/186 |

*Primary Examiner*—Everette A. Powell, Jr.
*Attorney, Agent, or Firm*—Craig & Antonelli

[57] ABSTRACT

A Francis-type runner for pump-turbines comprising a crown ring, a shroud ring and a plurality of runner blades interconnected therebetween, each of said blades satisfying the following relations where $0.09 \leq B/D \leq 0.30$:

| in the case where | $15° \leq \theta \leq 35°$ |
| and | $10° \leq \gamma \leq 19°$; |
| in the case where | $20(\gamma - 12.3)/9° = \theta$ |
| where | $19° \leq \gamma \leq 28°$; |

D = a diameter of a circle circumscribing the outer ends of the respective runner blades;

B = a height of the outer end of the runner blade between the crown ring and the shroud ring;

γ = an angle between the tangent at the outer end of the runner blade to the curved surface thereof and the tangent at the outer end of the runner blade to the circle circumscribing the outer ends of the respective runner blades, both tangents being in a horizontal plane close to the crown ring; and θ = an angle which the outer edge of the runner blade forms relative to a vertical plane passing through the center axis of the runner; whereby dual characteristics of operation showing a double efficiency curve are eliminated.

1 Claim, 7 Drawing Figures

FRANCIS-TYPE RUNNER FOR PUMP-TURBINE

BACKGROUND OF THE INVENTION

The present invention relates to a Francis-type runner, and, more particularly, to the contour of a runner blade at the runner entrance.

In general, a Francis-type runner comprises a crown ring, a shroud ring and a plurality of runner blades interconnected therebetween. Pump-turbines having conventional Francis-type runners have dual characteristics of operation in which two efficiencies correspond with a given rotational speed of the runner within a predetermined range during the operation of the turbine when the opening of the runner blade remains constant.

The reason for the dual characteristics of operation is that flowing water is separated from the runner blades on the side of the crown ring at the runner entrance. That is, if consideration is given to the case where the rotational speed of the runner and the angle of the absolute velocity of water entering the runner are maintained constant and the head of water is reduced, the direction of the relative velocity of water flow at the runner entrance forms a large negative angle relative to the working surface of the runner blade because the flow rate of the entering water is decreased. Consequently, flowing water does not flow smoothly at the working surface of the runner blade and is separated therefrom.

As described above, when the phenomenon of the separation of flowing water occurs, the flow rate of flowing water or the work done on the working surface of the runner blade is changed, thereby increasing or decreasing the efficiency of the pump-turbine.

SUMMARY OF THE INVENTION

The experiments conducted by the inventor showed that the aforesaid phenomenon of separation of flowing water from the working surface of the runner blade was produced on the sides of the crown ring and shroud ring. However, it was also found that the separation of flowing water from the working surface of the runner blade on the side of the crown ring was concerned with the occurrence of the dual characteristics of operation, and on the other hand, the separation of flowing water from the working surface of the runner blade on the side of the shroud ring served to eliminate the dual characteristics of operation. Thus, when flowing water is separated from the working surface of the runner blade on the side of crown ring, the pattern of water flow in the flow passages is varied. As a result, the amount of work done on the working surface of the runner blade by flowing water is reduced to thereby lower the efficiency of the pump-turbine, and a phenomenon of cavitation takes place at the low pressure portion of flowing water, thus resulting in increased vibrations of the flowing water.

The dual characteristics of operation are caused by the separation of flowing water from the working surface of the runner blade on the side of the crown ring, particularly at the runner entrance. Additionally, if consideration is given to the case where the absolute velocity of flowing water is maintained constant and the peripheral velocity of the runner is increased, the negative angle of the relative velocity of flowing water relative to the working surface of the runner blade is increased with the increase of the relative velocity, so that the phenomenon of separation of flowing water is liable to take place. Consequently, the dual characteristics of operation notably take place in the Francis-type runner for use with pump-turbines having runners of a large diameter, but it is hard for the dual characteristics of operation to occur in the Francis-type runner for use with pump-turbines having runners of a relatively small diameter.

Therefore, according to the present invention, the contour of runner blade on the side of the crown ring at the runner entrance is properly designed whereby the separation of flowing water is eliminated, and the dual characteristics of operation can be prevented from occurring.

DESCRIPTION OF THE PREFERRED EMBODIMENT

Figure 1A:
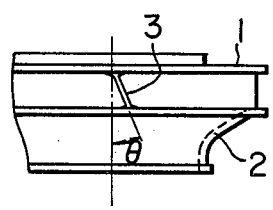
FIG. 1A is an elevational view of a Francis-type runner in accordance with the present invention.
Figure 1B:
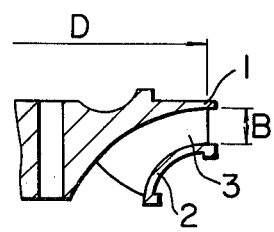
FIG. 1B is a fragmentary, vertically sectional view of the Francis-type runner of FIG. 1A.

Referring to FIGS. 1A and 1B, a Francis-type runner for use with pump-turbines comprises a crown ring 1, a shroud ring 2 and a plurality of runner blades 3. Each runner blade has an outer diameter (D), a height (B) and an inlet sweepback angle ($\theta$) at the runner entrance edge. Here, the inlet sweepback angle ($\theta$) is an angle formed by the entrance edge portion of the runner blade 3 relative to a vertical plane passing through the center axis of the runner. See FIG. 1A.

Figure 2:
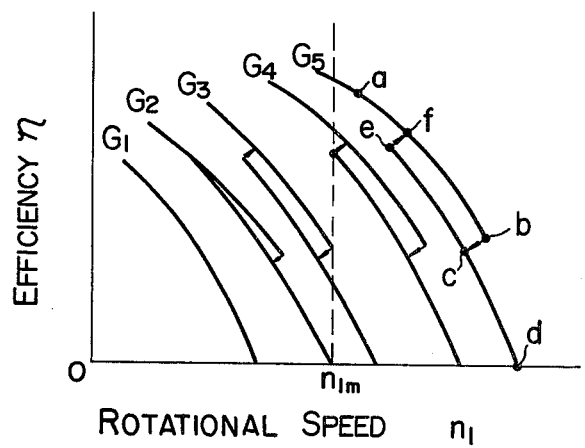
FIG. 2 is a plot illustrating the efficiencies of the model pump-turbine versus the rotational speed.

Referring to FIG. 2, an efficiency of a model pump-turbine having a conventional Francis-type runner is shown. That is, the rotational speed $n_1$ per unit head of the model is represented by the abscissa and the efficiency $\eta$ by the ordinate with the runner blade opening G being employed as a variable parameter. The so-calld dual characteristics of operation showing a double efficiency curve occur at a given rotational speed within a predetermined range of runner blade openings $G_2$ to $G_5$. Now, as the rotational speed $n_1$ is gradually increased from the point ($a$) on the performance curve $G_5$ for one runner blade opening, the efficiency suddenly shifts from the point ($b$) on the high-efficiency performance curve $a$ - $b$ to the point ($c$) on the low-efficiency performance curve $d$ - $e$. When the rotational speed $n_1$ is increased or decreased on the low-efficiency performance curve $d$ - $e$, the efficiency is correspondingly increased or decreased without sudden changes.

When the point e is reached, however, the efficiency suddenly shifts from the point ($e$) on the low-efficiency performance curve to the point ($f$) on the high-efficiency performance curve $a$ - $b$.

If the above characteristics of the model pump-turbine is practiced in a prototype pump-turbine, the following conditions are satisfied. That is, the following relationship is established between the rotational speed $n_1$ per unit head of the model pump-turbine and the rotational speed $N_p$ of the prototype pump-turbine.

$$n_1 = N_p (H/H_p)^{1/2} \cdot (D_p/D)$$

where
H = an effective unit head of the model pump-turbine;
n = a rotational speed of the model pump-turbine;
D = the outer diameter of the model pump-turbine;
$H_p$ = an effective head of the prototype pump-turbine; and
$D_p$ = the outer diameter of the prototype pump-turbine.

Figure 3:
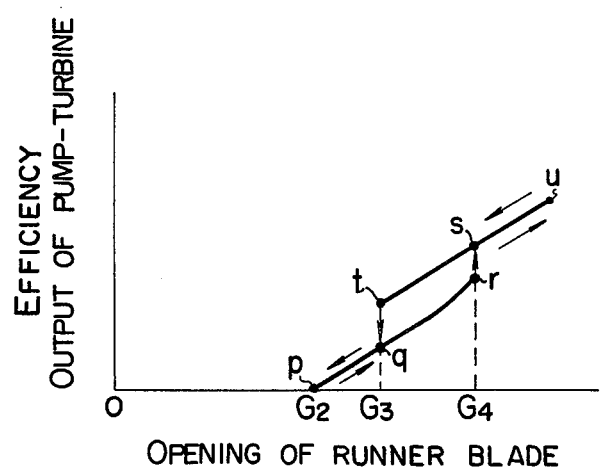
FIG. 3 is a plot illustrating the outputs of the model pump-turbine versus the runner blade opening.

Thus, when $N_p$ and $H_p$ take certain values respectively, the rotational speed $n_1$ per effective unit head of the model pump-turbine (corresponding to the rotational speed $N_p$ of the prototype pump-turbine) takes a certain value $n_{1m}$. Now, when $N_p$ and $H_p$ take certain values respectively, that is, $n_1$ takes a certain value $n_{1m}$, the efficiency of the prototype pump-turbine is shown in FIG. 3. That is, as the runner blade opening is gradually increased from the fully closed position, the rotational speed $N_p$ of the pump-turbine reaches a certain value at a certain opening $G_2$, that is, $n_1$ reaches $n_{1m}$. As the opening G is gradually increased with the rotational speed maintained constant, the efficiency suddenly shifts from the point (r) on the low-efficiency output curve p - r to the point (s) on the high-efficiency output curve t - u. Then, in the case where the efficiency is on the high-efficiency output curve t - u with $n_1$ being maintained at $n_{1m}$, the efficiency suddenly shifts from the point (t) on the curve t - u to the point (q) on the low-efficiency output curve p - r as the runner blade opening G is gradually decreased.

Figure 4A:
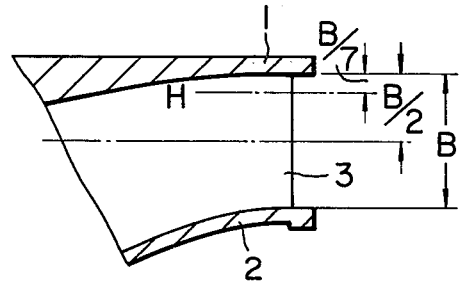
FIG. 4A is a fragmentary vertical sectional view showing the runner entrance in the Francis-type runner.
Figure 4B:
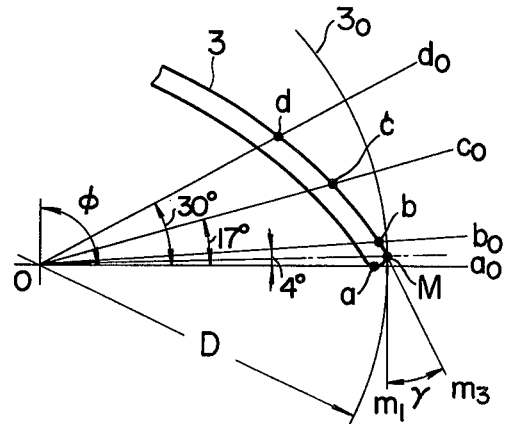
FIG. 4B is a fragmentary, horizontal sectional view schematically showing the runner entrance in the Francis-type runner.

The present inventor has obtained by experiments such a relationship between the sweepback angle ($\theta$) and the inlet angle $\gamma$ of the runner blade on the side of the crown ring that the dual characteristics of operation can be prevented from occuring, in which experiments both angles were experimentally varied in the Francis-type runner for use with pump-turbines in which the outer diameter D of the runner blade and the height B at the runner entrance satisfied the relationship of $0.045 \leq B/D \leq 0.38$. Here, the inlet angle $\gamma$ of the runner blade 3 is an angle selected in a horizontal plane (H) of FIG. 4A and spaced from the underside of the crown ring 1 by a distance equal to 1/7 of the height (B) of the runner blade 3 at the runner entrance. The reason for this selection is that the phenomenon of separation of flowing water connected with the occurrence of the dual characteristics of operation takes place at the working surface of the runner blade close to the crown ring 1. The area within which a significant influence is exerted on the occurrence of the phenomenon of separation of flowing water is limited on the working surface of the runner blade included within a central angle of 30° measured from a line passing through the entrance edge (a) of the runner blade and the center (O) of the runner blade. As shown in FIG. 4B, the runner blade surface is actually contoured by a combination of complicated curved surfaces, but can be approximated by combining several circular arcs.

There is obtained a point (M) of intersection of an outer circle $3_o$ of the runner blade 3. There is also obtained a circular arc $\overset{\frown}{bcd}$ passing through points b, c, d of intersections of the working surface of the same runner blade, which points are crossed by lines $\overline{Ob_o}$, $\overline{Oc_o}$ and $\overline{Od_o}$ spaced apart by 4°, 17° and 30°, respectively, from a line $\overline{Oa}$ (which is also line $\overline{Oa_o}$) passing through the entrance edge (a) and the center (O) of the runner blade 3. An angle formed between the normal $Mm_1$ at the point M on line OM and the tangent $Mm_3$ to the arc $\overset{\frown}{bcd}$ is designated as the inlet angle $\gamma$ of the runner blade 3.

According to the results of experiments, the dual characteristics of operation are prevented from occurring irrespective of the values of the inlet angle $\gamma$ and the sweepback angle $\theta$ because water flow in the flow passage between the runner blades is hard to vary in the vertical direction along the height of the runner blade in the case where the height B at the runner entrance is small.

As a result, it has been found that when the height B of the runner blade at the runner entrance is less than 9% of the outer diameter D of the runner blade and when the height B is more than 30% of the outer diameter D, the dual characteristics of operation do not take place. Thus, the dual characteristics of operation take place only when the condition of $0.09 \leq B/D \leq 0.30$ is satisfied.

It has been also found that the contour of the runner blade within the range of the central angle of approximately 30° at the runner entrance is closely related to the occurrence of the dual characteristics of operation.

Figure 5:
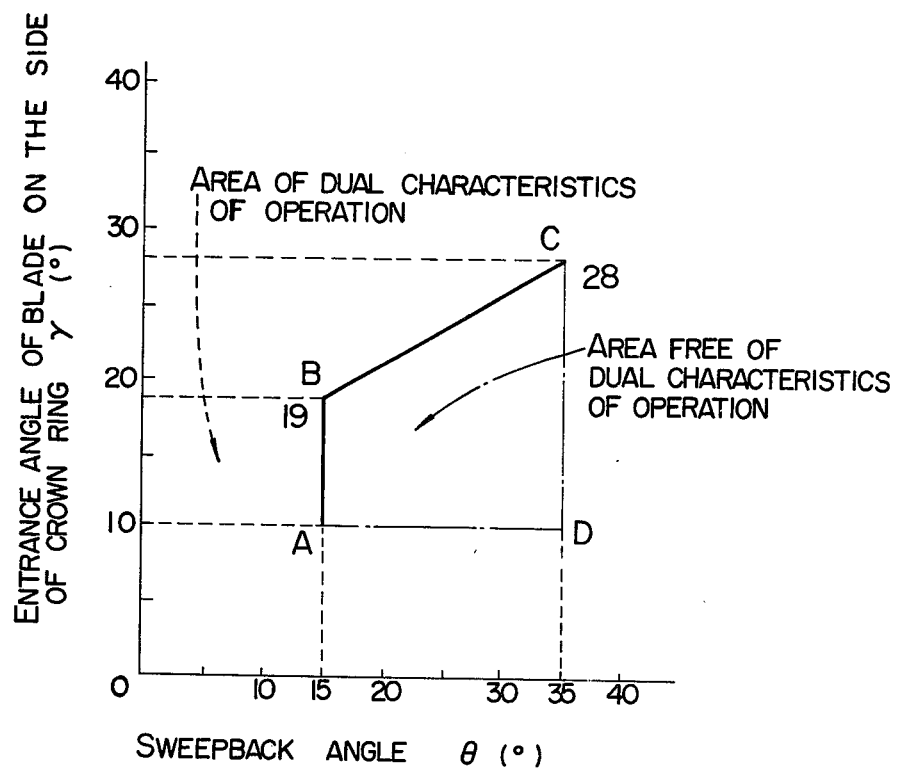
FIG. 5 is a plot illustrating the inlet angle $\gamma$ of the runner blade on the side of the crown ring versus the angle of sweepback $\theta$.

According to the results of experiments, the contour of a runner blade free of the dual characteristics of operation is defined by a quadrangle ABCD shown in FIG. 5. That is, $\theta$ is defined by the inequality $15° \leq \theta \leq 35°$, in the case where $10° \leq \gamma \leq 19°$; but $\theta$ is defined by the equation $(20(\gamma - 12.3)/9)°$ in the case where $19° \leq \gamma \leq 28°$. The equation $(20(\gamma - 12.3)/9)°$ is represented as a straight line connecting the points B and C is FIG. 5.

According to the present invention, such a Francis-type runner can be provided which is free of the dual characteristics of operation as well as of vibrations and is high in efficiency.

What is claimed is:

1. A Francis-type runner for water pump-turbines comprising a crown ring, a shroud ring and a plurality of runner blades interconnected therebetween, each of said blades satisfying the following relations where $0.09 \leq B/D \leq 0.03$:

| | |
|---|---|
| | $15° \leq \theta \leq 35°$ |
| in the case where | $10° \leq \gamma \leq 19°$, |
| and | $20(\gamma - 12.3)/9° = \theta$ |
| in the case where | $19° \leq \gamma \leq 28°$, | where
D = a diameter of a circle circumscribing the outer ends of the respective runner blades;
B = a height of the outer end of the runner blade between the crown ring and the shroud ring;
$\gamma$ = an angle between the tangent at the outer end of the runner blade to the curved surface thereof and the tangent at the outer end of the runner blade to the circle circumscribing the outer ends of the respective runner blades, both tangents being in a horizontal plane close to the crown ring; and
$\theta$ = an angle which the outer edge of the runner blade forms relative to a vertical plane passing through the center axis of the runner; whereby dual characteristics of operation showing a double efficiency are eliminated.

* * * * *